(12) United States Patent
Song

(10) Patent No.: US 9,537,126 B2
(45) Date of Patent: Jan. 3, 2017

(54) BATTERY PACK

(71) Applicant: LG ELECTRONICS INC., Seoul (KR)

(72) Inventor: Jae Heon Song, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 14/383,325

(22) PCT Filed: Mar. 5, 2013

(86) PCT No.: PCT/KR2013/001747
§ 371 (c)(1),
(2) Date: Sep. 5, 2014

(87) PCT Pub. No.: WO2013/133598
PCT Pub. Date: Sep. 12, 2013

(65) Prior Publication Data
US 2015/0056495 A1    Feb. 26, 2015

(30) Foreign Application Priority Data
Mar. 6, 2012   (KR) .................. 10-2012-0022998

(51) Int. Cl.
*H01M 2/10* (2006.01)
*H01M 2/22* (2006.01)
*H01M 2/20* (2006.01)
*H01M 10/0525* (2010.01)
*H01M 2/30* (2006.01)

(52) U.S. Cl.
CPC ........... *H01M 2/1077* (2013.01); *H01M 2/206* (2013.01); *H01M 2/22* (2013.01); *H01M 10/0525* (2013.01); *H01M 2/305* (2013.01); *H01M 2220/20* (2013.01)

(58) Field of Classification Search
CPC .................................. H01M 2/22; H01M 2/10
See application file for complete search history.

(56) References Cited

FOREIGN PATENT DOCUMENTS

| | | |
|---|---|---|
| JP | 2000-215877 A | 8/2000 |
| JP | 2003-077450 A | 3/2003 |
| JP | 2011-171107 A | 9/2011 |
| KR | 10-2010-0080414 A | 7/2010 |
| KR | 10-2012-0010928 A | 2/2012 |

OTHER PUBLICATIONS

International Search Report dated Jun. 24, 2013 issued in Application No. PCT/KR2013/001747 (with English Translation).

*Primary Examiner* — Carlos Barcena
(74) *Attorney, Agent, or Firm* — KED & Associates, LLP

(57) ABSTRACT

The battery pack according to the present invention includes a plurality of battery cells generating an electric current to which leads are connected in order to supply the generated electric current. At least two of the leads of the battery cells are welded in the plurality of battery cells. A shock absorbing unit is formed bent between the welded connection portion and the battery cell of each of the leads. Therefore, it is possible to minimize damage to the connection portions of the leads caused by external vibration or shock, and to improve the durability of the leads.

4 Claims, 2 Drawing Sheets

BATTERY PACK

CROSS-REFERENCE TO RELATED PATENT APPLICATIONS

This application is a U.S National Stage Application under 35 U.S.C. §371 of PCT Application No. PCT/KR2013/001747, filed Mar. 5, 2013, which claims priority to Korean Patent Application No. 10-2012-0022998, filed Mar. 6, 2012, whose entire disclosures are hereby incorporated by reference.

TECHNICAL FIELD

The present invention relates to a battery pack which can be used for electric vehicles, and more particularly to a battery pack in which leads are connected to battery cells.

BACKGROUND ART

One of the biggest problems of vehicles using fossil fuels, such as gasoline and diesel, is creation of air pollution. In order to solve this problem, a technology of using a rechargeable secondary battery as a power source of vehicles has attracted considerable attention. Accordingly, an electric vehicle (EV), which is driven only by a battery, and a hybrid electric vehicle (HEV), which combines a conventional engine with a battery, have been developed and some thereof are now being commercially used. A nickel-metal hydride (Ni-MH) secondary battery has been mainly used as the power source of EV and HEV. Recently, use of a lithium-ion battery has also been attempted.

High output and large capacity are needed for such a secondary battery to be used as the power source of EV and HEV. To this end, a battery pack having a structure, in which a plurality of small-sized secondary batteries (unit batteries or battery cells) are connected in series and/or in parallel, is used.

The battery pack may include a plurality of battery cells to which leads are connected, and the leads of the battery cells may be welded to each other.

DISCLOSURE

Technical Problem

A conventional battery pack has a problem such that welded connection portions of leads may be damaged by shock or vibration.

Technical Solution

The above and other objects can be accomplished by the provision of a battery pack comprising: a plurality of battery cells for generating electric current, the battery cells being connected with leads for supplying the generated electric current, wherein at least two of the leads of the battery cells are welded to each other, and each of the leads is formed with a welded connection portion and a shock absorbing unit bent between the welded connection portion and each of the battery cells.

The shock absorbing units formed at the leads may protrude in opposite directions.

The shock absorbing unit may be bent at least twice.

The shock absorbing unit may include a first bent portion bent from each of the leads, a second bent portion bent symmetrically to the first bent portion from each of the leads, and a third bent portion connecting the first bent portion and the second bent portion.

The third bent portion may have an obtuse angle with respect to each of the first bent portion and the second bent portion.

The first bent portion and the second bent portion may be bent obliquely from each of the leads, and the third bent portion may be bent horizontally from the first bent portion and the second bent portion.

The shock absorbing unit may have a buffer space formed inward thereof.

The shock absorbing unit formed at the lead of the battery cell disposed at an upper position of the battery cells may protrude upward, and the shock absorbing unit formed at the lead of the battery cell disposed at a lower position of the battery cells may protrude downward.

The shock absorbing unit may have a height which is one tenth to half a thickness of each of the battery cells.

Effects of the Invention

The present invention can minimize damage to welded connection portions of the leads caused by external vibration or shock and improve durability of the leads.

DETAILED DESCRIPTION FOR IMPLEMENTING THE INVENTION

Figure 1:
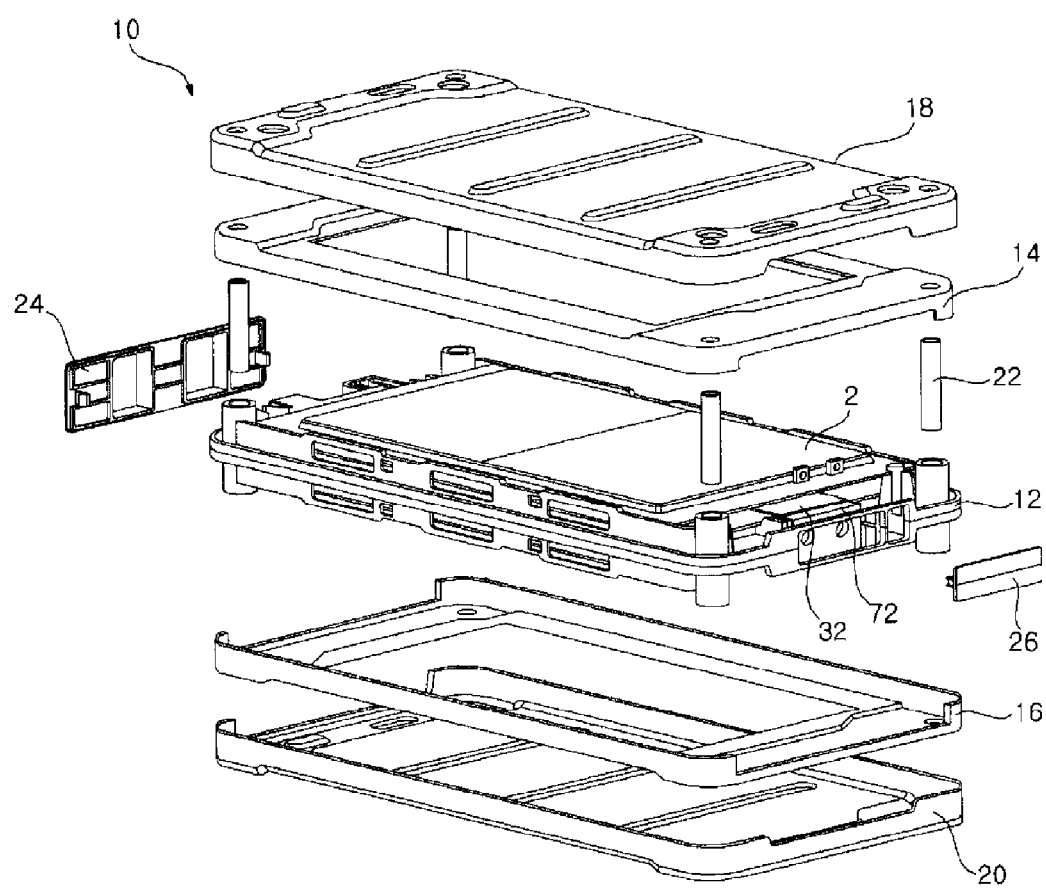
FIG. 1 is an exploded perspective view of a battery pack according to one embodiment of the present invention.
Figure 2:
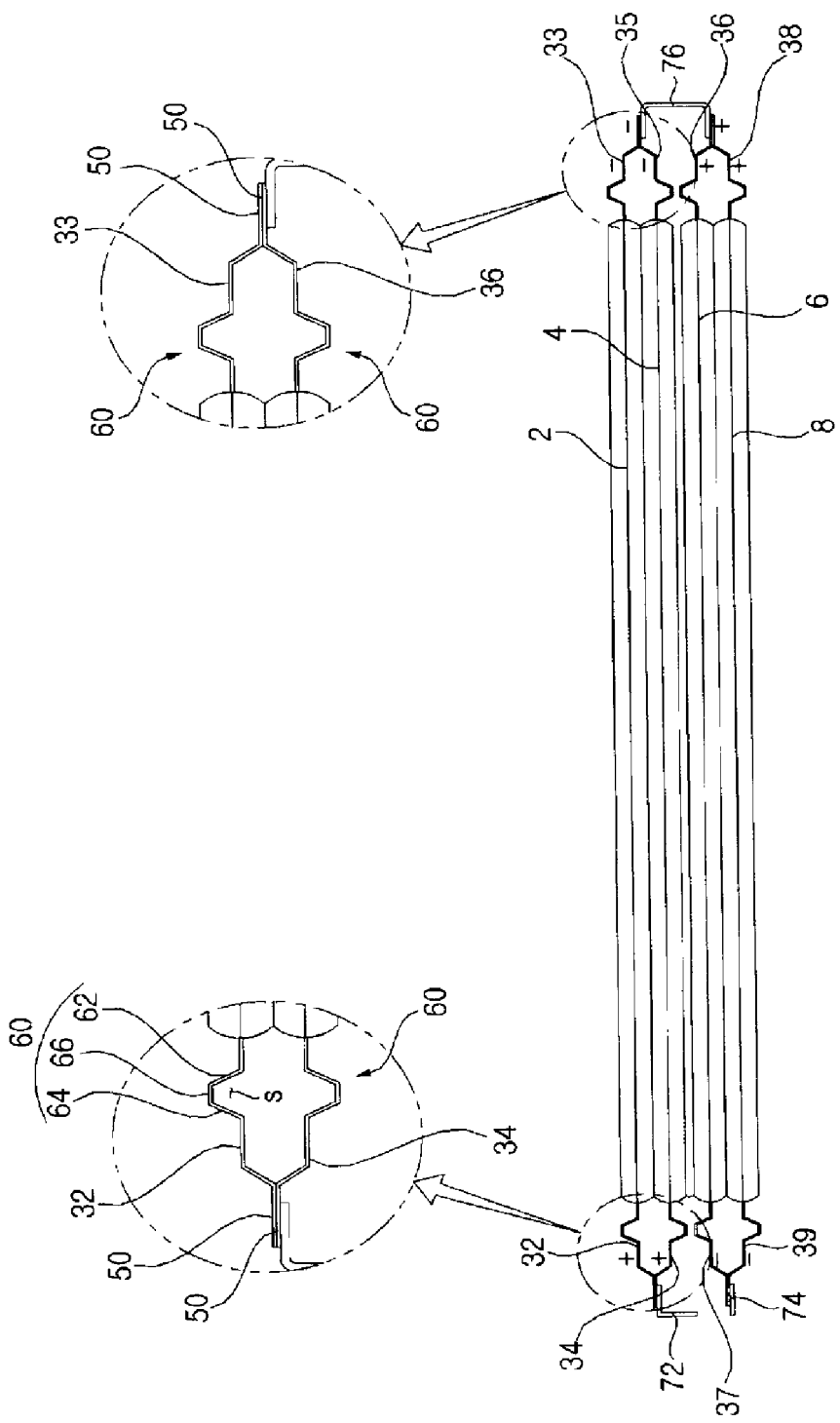
FIG. 2 is a schematic side view of a battery pack according to one embodiment of the present invention.

FIG. 1 is an exploded perspective view of a battery pack according to one embodiment of the present invention, and FIG. 2 is a schematic side view of a battery pack according to one embodiment of the present invention.

A battery pack according to one embodiment of the present invention includes battery cells 2, 4, 6 and 8 and a cartridge 10 for protecting the battery cells 2, 4, 6 and 8.

The battery cells 2, 4, 6 and 8 may be lithium-ion (Li-ion) cells, which generate electric current.

The battery cells 2, 4, 6 and 8, which lie horizontally, may be provided in plural.

The cartridge 10 may include a center cartridge 12, an upper inner cartridge 14, a lower inner cartridge 16, an upper cover 18 and a lower cover 20.

The battery cells 2, 4, 6 and 8 may be disposed in the center cartridge 12. The upper inner cartridge 14 may closely contact the edges of the upper surface of the uppermost battery cell 2 of the battery cells 2, 4, 6 and 8, and the upper cover 18 may closely contact the central portion of the upper surface of the uppermost battery cell 2. The lower inner cartridge 16 may closely contact the edges of the lower surface of the lowermost battery cell 8 of the battery cells 2, 4, 6 and 8, and the lower cover 20 may closely contact the central portion of the lower surface of the lowermost battery cell 8.

The center cartridge 12 may be provided with a spacer 22 which supports the upper inner cartridge 14, the upper cover 18, the lower inner cartridge 16 and the lower cover 20 and is penetrated by a long bolt when the battery packs are stacked and coupled to each other.

A front cover 24 may be coupled to a front surface of the center cartridge 12, and a rear cover 26 may be coupled to a rear surface of the center cartridge 12.

Preferably, the upper cover 18 and the lower cover 20 may be made of aluminum having superior heat dissipation properties.

Leads 32, 33, 34, 35, 36, 37, 38 and 39 may be connected to the battery cells 2, 4, 6 and 8 in order to supply the generated electric current. The leads 32, 33, 34, 35, 36, 37, 38 and 39 may include anode leads 32, 34, 36 and 38 connected to one end portion of the battery cells 2, 4, 6 and 8 and cathode leads 33, 35, 37 and 39 connected to the other end portion of the battery cells 2, 4, 6 and 8.

At least two of the leads of the battery cells 2, 4, 6 and 8 may be welded to each other.

The battery cells 2, 4, 6 and 8 may include a first battery cell 2, a second battery cell 4, a third battery cell 6 and a fourth battery cell 8.

The plural battery cells 2, 4, 6 and 8 may be connected in a bundle in such a manner that two battery cells are connected in a bundle, three battery cells are connected in a bundle, or four battery cells are connected in a bundle.

In the case in which each two of the battery cells 2, 4, 6 and 8 are connected in a bundle, the leads of each two battery cells may be welded to each other. The first battery cell 2 and the second battery cell 4 may be connected in parallel, and the third battery cell 6 and the fourth battery cell 8 may be connected in parallel. The bundle of the first battery cell 2 and the second battery cell 4 and the bundle of the third battery cell 6 and the fourth battery cell 8 may be connected in series.

The anode leads 32 and 36 connected to the battery cells 2 and 6 disposed at an upper position in each bundle of two battery cells may be welded to the anode leads 34 and 38 connected to the battery cells 4 and 8 disposed at a lower position in each bundle of two battery cells.

The cathode leads 33 and 37 connected to the battery cells 2 and 6 disposed at an upper position in each bundle of two battery cells may be welded to the cathode leads 35 and 39 connected to the battery cells 4 and 8 disposed at a lower position in each bundle of two battery cells.

Each of the leads 32, 33, 34, 35, 36, 37, 38 and 39 may be formed with a shock absorbing unit 60 which is bent between a welded connection portion 50 and each of the battery cells 2, 4, 6 and 8.

The shock absorbing units 60 formed at each two of the leads 32, 33, 34, 35, 36, 37, 38 and 39 may protrude in opposite directions.

The leads 32, 33, 34, 35, 36, 37, 38 and 39 may be arranged such that the shock absorbing units 60 formed at the leads 32, 33, 36 and 37 disposed at an upper position in each bundle of two battery cells may protrude upward and the shock absorbing units 60 formed at the leads 34, 35, 38 and 39 disposed at a lower position in each bundle of two battery cells may protrude downward.

The leads 32, 33, 34, 35, 36, 37, 38 and 39 may also be arranged such that the shock absorbing units 60 formed at the leads 32, 33, 36 and 37 disposed at an upper position in each bundle of two battery cells may protrude downward and the shock absorbing units 60 formed at the leads 34, 35, 38 and 39 disposed at a lower position in each bundle of two battery cells may protrude upward.

The shock absorbing unit 60 is configured to be resiliently deformed by shock or vibration so as to absorb the shock or vibration, and may be bent at least twice.

The shock absorbing unit 60 may include a first bent portion 62 which is bent from each of the leads 32, 33, 34, 35, 36, 37, 38 and 39, a second bent portion 64 which is bent symmetrically to the first bent portion 62 from each of the leads 32, 33, 34, 35, 36, 37, 38 and 39, and a third bent portion 66 connecting the first bent portion 62 and the second bent portion 64. The first bent portion 62 and the second bent portion 64 may be bent obliquely from the lead. The shock absorbing unit 60 may have a buffer space S formed inward thereof. The third bent portion 66 may have an obtuse angle with respect to each of the first bent portion 62 and the second bent portion 66. The third bent portion 66 may be bent horizontally from the first bent portion 62 and the second bent portion 64.

If the shock absorbing unit 60 is too high, because the shock absorbing unit 60 may interfere with the upper cover and the lower cover 20, the height of the shock absorbing unit 60 is preferably half or less the thickness of the battery cells. If the shock absorbing unit 60 is too low, because the shock absorbing ability may be deteriorated or the first bent portion 62 or the third bent portion 66 may not be dented into the buffer space S when receiving external shock, the height of the shock absorbing unit 60 is preferably one tenth or more the thickness of the battery cells.

Preferably, the thickness of the shock absorbing unit 60 may be one tenth to half the thickness of each of the battery cells.

The battery pack may include terminals 72, 74 and 76 which contact the leads 32, 33, 34, 35, 36, 37, 38 and 39 to receive electric current from the leads 32, 33, 34, 35, 36, 37, 38 and 39.

The terminals 72, 74 and 76 may be connected to an external device, such as a motor to which the battery pack supplies electric current, through a high voltage cable, and may be configured as a bus bar made of copper.

The terminals 72, 74 and 76 may include an anode terminal 72, a cathode terminal 74 and a series terminal 86.

The anode terminal 72 may be connected to one of the anode leads 32, 34, 36 and 38. The cathode terminal 74 may be connected to one of the cathode leads 33, 35, 37 and 39. The series terminal 76 may be connected to another one of the anode leads 32, 34, 36 and 38 and another one of the cathode leads 33, 35, 37 and 39.

Hereinafter, an operational effect of the present invention constituted as above will be described.

If shock or vibration is applied to the battery pack, the battery cells 2, 4, 6 and 8 may be pushed in one direction or vibrated by shock.

When the battery cells 2, 4, 6 and 8 are pushed or vibrated, shock or vibration is transmitted to the leads 32, 33, 34, 35, 36, 37, 38 and 39. The shock or vibration transmitted through the leads 32, 33, 34, 35, 36, 37, 38 and 39 is absorbed in the shock absorbing unit 60, and shock or vibration transmitted to the welded connection portion 50 can be minimized.

The shock absorbing unit 60 absorbs shock or vibration in such a manner that at least one of the first bent portion 62, the second bent portion 64 and the third bent portion 66 is resiliently deformed. The first bent portion 62 and the second bent portion 64 may be dented into the buffer space S defined by the shock absorbing unit 60, thereby absorbing shock in the shock absorbing unit 60, and may be restored to the original shapes when shock or vibration is removed.

The invention claimed is:
1. A battery pack comprising:
 a plurality of battery cells to generate an electric current, the battery cells being connected with leads to supply the generated electric current, wherein at least two of the leads of the battery cells are welded to each other, and each of the leads is formed with a welded connection portion and a shock absorber bent between the welded connection portion and each of the battery cells, wherein the shock absorber includes a first bent portion bent from each of the leads, a second bent portion bent symmetrically to the first bent portion from each of the leads, and a third bent portion connecting the first bent portion and the second bent portion, wherein the first bent portion and the second bent portion are bent obliquely from each of the leads, and the third bent portion is bent horizontally from the first bent portion and the second bent portion, wherein the third bent portion has an obtuse angle with respect to each of the first bent portion and the second bent portion, wherein the first bent portion, the second bent portion, and the third bent portion form a buffer space, and wherein at least one of the first bent portion and the second bent portion becomes dented into the buffer space and the third bent portion remains horizontally level when shock or vibration is applied to the battery pack.

2. The battery pack according to claim 1, wherein the shock absorbers formed at the leads protrude in opposite directions.

3. The battery pack according to claim 1, wherein the shock absorber formed at the lead of the battery cell provided at an upper position of the battery cells protrudes upward, and the shock absorber formed at the lead of the battery cell provided at a lower position of the battery cells protrudes downward.

4. The battery pack according to claim 1, wherein the shock absorber has a height which is one tenth to half a thickness of each of the battery cells.

* * * * *